H. W. HITCHCOCK.
ELECTRICAL INDICATING AND MEASURING DEVICE.
APPLICATION FILED APR. 7, 1920.

1,398,266.

Patented Nov. 29, 1921.

2 SHEETS—SHEET 2.

INVENTOR.
H. W. Hitchcock
BY
ATTORNEY

UNITED STATES PATENT OFFICE.

HARRY W. HITCHCOCK, OF NEW YORK, N. Y., ASSIGNOR TO AMERICAN TELEPHONE AND TELEGRAPH COMPANY, A CORPORATION OF NEW YORK.

ELECTRICAL INDICATING AND MEASURING DEVICE.

1,398,266.      Specification of Letters Patent.      Patented Nov. 29, 1921.

Application filed April 7, 1920. Serial No. 371,954.

*To all whom it may concern:*

Be it known that I, HARRY W. HITCHCOCK, residing at New York, in the county of Bronx and State of New York, have invented certain improvements in Electrical Indicating and Measuring Devices, of which the following is a specification.

This invention relates to electrical indicating and measuring devices and especially to devices of that class which are adapted to indicate the component frequencies present in signaling circuits, subject to induction from foreign circuits, and also the harmonics that may be present in the power circuits themselves.

It is well known that signaling circuits, such as telephone or telegraph circuits, which are exposed to power transmission circuits, frequently have induced therein voltages of certain frequencies which cause undesirable disturbances in the apparatus associated with the signaling circuits. In investigating the cause of such electrical interference, it is desirable to analyze the current and voltage waves in order to determine the source of the said interference and to suggest means for overcoming it. It is the object of this invention to provide a portable resonant wave analyzer, which is adapted to indicate the frequencies of the interfering waves set up in signaling circuits by foreign circuits, and also within limits to measure the intensity of the interfering wave.

Figure 1:
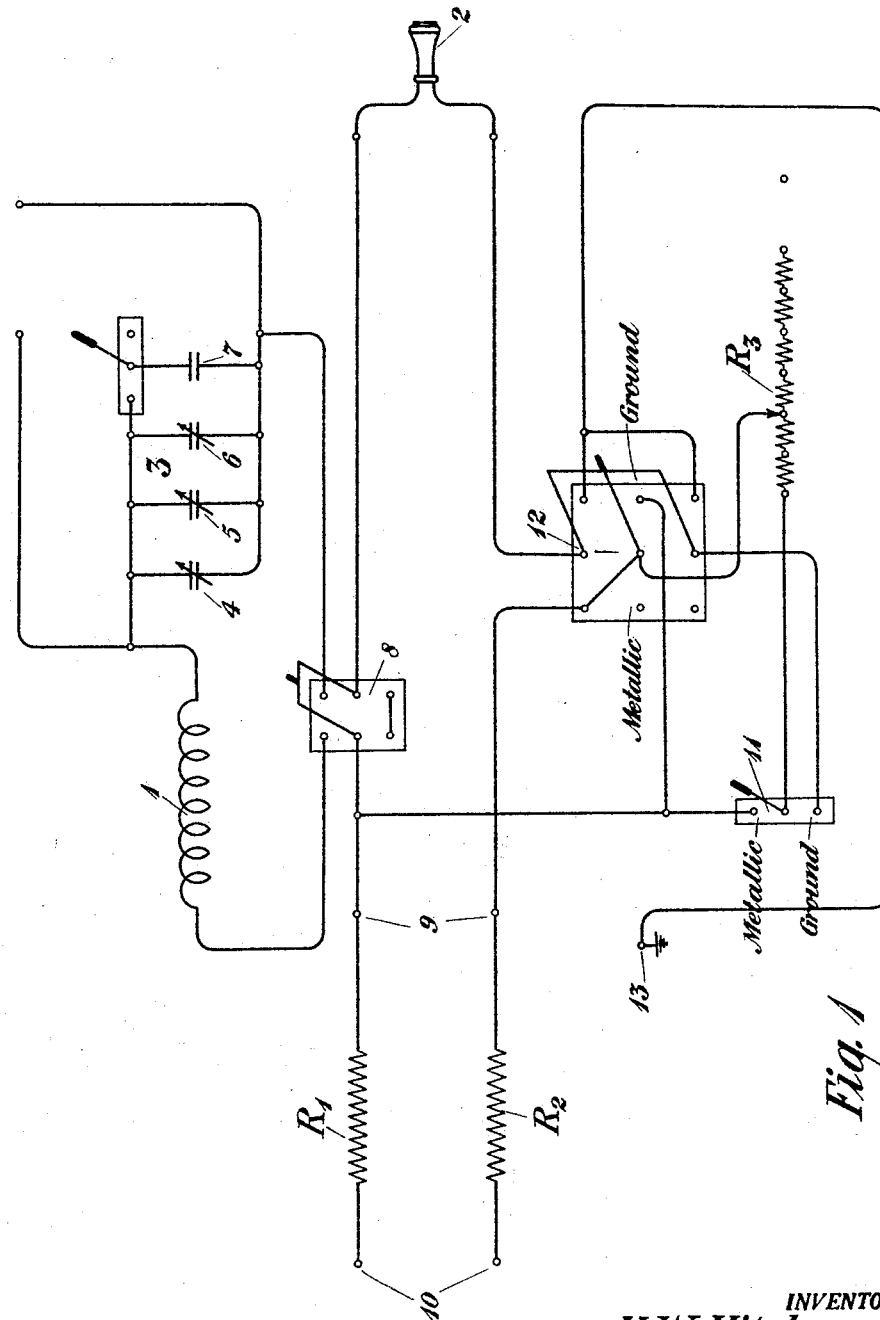

This invention will be better understood from the following description, when read in connection with the attached drawings, Figure 1 of which shows schematically the circuit arrangement of the resonant wave analyzer, and Figs. 2, 3, 4 and 5 show the mode of connection of the analyzer with various circuits in order to make the proper determinations.

The frequency analyzer represented in Fig. 1 comprises a resonant circuit, consisting of a retardation coil 1 of large inductance and small resistance connected in series with a receiver 2, and a condenser 3 of variable capacitance. A preferable type of coil for a portable instrument has an inductance of approximately 8.5 henrys at 800 cycles, and effective resistance of approximately 300 and 1300 ohms at frequencies of 300 and 1600 cycles respectively. The effective resistance of the coil at any given frequency varies very little with the current provided the latter does not exceed 50 microamperes. The condenser 3 comprises a variable air unit 4, two variable mica units 5 and 6 and one fixed mica unit 7. The variable air condenser 4 has preferably a capacitance ranging from .0001 to .001 micro-farads. The air condenser 4 is combined with the fixed mica condenser (not shown) each having a capacitance equal to one half the range indicated above, and coöperating with each other so that values throughout the entire range of their joint capacities may be obtained. Such a condenser is shown in the pending application of H. W. Hitchcock, Serial No. 253,651, filed September, 11th 1918. The variable mica condensers 5 and 6 have preferably capacitances ranging from .001 to .01 and from .01 to .1 micro-farads respectively, and condenser 7 has capacitance of .1 micro-farad. It is to be understood that the designation of certain specific values for certain parts is not to be construed as a limitation, but merely as suggesting preferable values for the parts of an apparatus which was intended to be of a portable nature.

Connected with the resonant circuit as heretofore described are a plurality of switches and resistances which taken together with said circuit comprise the testing circuit. Signaling circuits under test are connected with the test circuit by means of binding posts or other suitable connectors 9. Low voltage power circuits when being tested are connected with the test circuit by means of the binding posts 10, which introduces into the circuit the resistances $R_1$ and $R_2$ which tend to minimize the amount of current in the test circuit and thereby decreases its sensitivity and also increases the impedance of the test circuit. Associated with the test circuit is a variable resistance $R_3$, which has a two fold function, namely to control the intensity of the current in the receiver 2 by being shunted directly across the terminals of the testing circuit and also to minimize the effect that the impedance of the line circuit may have on the testing circuit. This variable resistance $R_3$ is connected with the circuit by means of the switch 11, which, when operated in its upward position, serves to connect the variable resistance with the line circuit to be tested metallically, and when operated in its lower position to connect the variable resistance with the circuit when testing to ground. The triple pole double throw switch 12 when operated to the left serves to bridge the analyzer circuit across a signaling or power circuit connected with the test posts 9 or 10; when operated to the right it serves to group together the terminals of the conductors, and to connect the grouped conductors with the resonant circuit to ground.

Having in mind the foregoing description of the parts of this apparatus and of the function that each part performs, this invention will be better understood from the following description of its mode of operation.

It is well known that for any frequency the reactance of the coil is constant, while that of the condenser is of opposite sign and inversely proportional to its capacitance. Therefore, for some setting of the condenser these two reactances are equal and opposite, so that their combined reactance is 0, that is to say, the circuit is in resonance. Under this condition the impedance of the instrument for this frequency consists only of its effective resistance, which is comparatively small. If a component of this frequency be present in the wave under analysis, it will be distinctly heard as a relatively pure tone. For all other frequencies the reactance of the analyzer is very high, so that they will be largely excluded. From the capacitance reading of the condenser corresponding to the maximum intensity of this tone, its frequency may be determined from a calibration curve which indicates the resonant value of the capacitance for each frequency. As soon as the condenser setting is changed, the resonant condition no longer exists for this particular frequency, and its tone quickly disappears. By systematically varying the capacitance over its whole range the current at each frequency, as its resonant point is reached, will rise to a maximum and then decrease again. In this way it is possible to determine what frequencies are present in the wave under analysis. If it is desired to determine the magnitude of each component, it may be done by measuring the volume of the sound caused in the receiver by the current of each frequency by means of a tone standard such as is described in the patent to Kirkwood 1,319,651, dated October 21, 1919.

Figure 2:
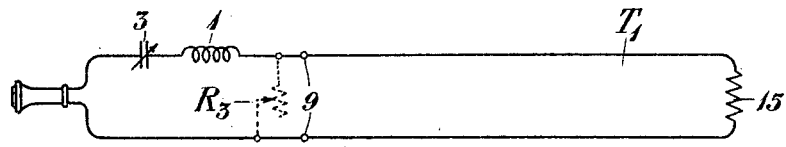
Figure 3:
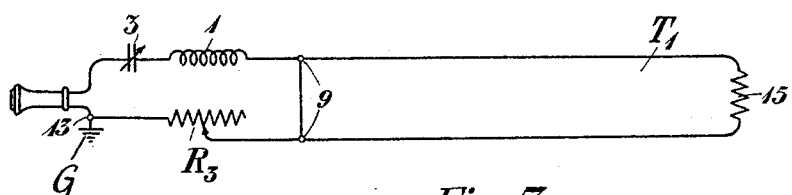
Figure 4:
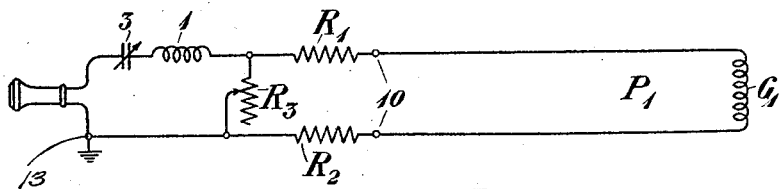
Figure 5:
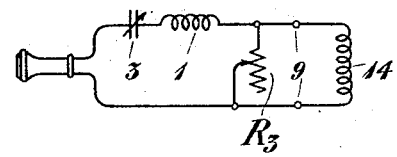

The manner in which the voltage or current waves which are present in either signaling or power circuits may be analyzed, is clearly shown in Figs. 2, 3, 4 and 5. Fig. 2 shows schematically the manner of investigating by means of the frequency analyzer the wave induced between the wires of a telephone circuit which is exposed to interference from a power circuit. Fig. 3 shows schematically the method for making a similar analysis between the two wires of a telephone circuit in parallel and ground. Fig. 4 shows the method for connecting the analyzer directly with a low voltage power circuit; and Fig. 5 shows a method for studying indirectly the wave form of a power circuit by means of an exploring coil. It is to be understood, however, that the use of the analyzer is not limited to the methods herein shown but is adapted to analyze any voltage wave that may be impressed upon it in such a way that the wave will not be distorted and will give a volume of tone of the harmonics suitable for detection with the ordinary telephone receiver, but not excessively loud.

In making the test metallically upon a telephone circuit, as shown in Fig. 2, the telephone circuit $T_1$ is connected with the binding posts 9 of the testing apparatus. $P_1$ represents a power circuit which is so disposed with regard to the telephone circuit as to induce in the latter disturbances, the nature of which it is desirable to investigate. Since this test is to be made metallically, the switches 11 and 12 are moved to the position marked "Metallic," and the position of switch 8 is such as to connect the inductance and capacity with the circuit under test. If the intensity of the tone is sufficiently strong, the shunt resistance $R_3$ should be connected across the circuit and varied in order to give a suitable volume of tone in the receiver. This shunt increases the sharpness of tuning and eliminates or reduces to a minimum the error that the reactance of the line in series with the analyzer produces in the normal condenser settings. By varying the condenser values throughout their entire range, various points of resonance will be obtained depending upon the frequencies of the harmonics present in the circuit under test. By means of a calibration curve previously referred to, the values of these frequencies may be obtained.

If the power circuit induces in the telephone circuit a voltage between the wires and ground of such high value that a tone will be detected in the receiver even when the variable resistance shunt $R_3$ is set at such a value as to short-circuit the resonant circuit, it is desirable to make the measurement between the telephone circuit and ground in the manner shown in Fig. 3 instead of metallically as shown in Fig. 2. In Fig. 3 we have the conductors of the signaling circuit $T_1$ grouped together at the binding posts 9 and the resonant circuit is connected to the ground G. In making this test the switches 11 and 12 are moved to their grounded position. This serves to connect the coil 1, condenser 3 receiver 2 and the variable resistance $R_3$ in parallel to ground. By varying the resistance $R_3$ the intensity of the current through the receiver 2 may be varied. Then the condenser 3 is systematically varied throughout its range and the values of the harmonics may be determined in the manner described in connection with Fig. 2.

In making the correct test upon a low voltage power circuit, as shown in Fig. 4, the power circuit $P_1$ having a source of electromotive force such as a generator $G_1$, is connected with the binding posts 10 instead of with the binding posts 9, so as to bring into the circuit the current limiting resistances $R_1$ and $R_2$. Switches 11 and 12 should be thrown to their metallic positions. The receiver 2 should be approximately at ground potential in order to reduce possibility of errors arising from unbalances to ground in the circuit. To determine if such exist, the variable resistance $R_3$ should be set at 0. A tone in the receiver under this condition indicates the presence of an unbalance to ground. If, on the other hand, one side of the power circuit is grounded, the other side should be connected to one of posts 10 and the grounded side to the post 13. Switches 11 and 12 should then be moved to their grounded positions. This arrangement will serve to connect the analyzer with the power circuit in series with one of the resistances, $R_1$ or $R_2$, and to reduce the receiver to ground potential. Now, in case the connections to the power circuit should be reversed, a test for current due to unbalance will indicate such reversal. By varying the resistance $R_3$ the proper volume of tone through the receiver 2 may be obtained. By varying the condenser 3 throughout its range of values, the harmonics in the power circuit may be determined.

In making indirect measurements upon a power circuit $P_1$, as shown in Fig. 5 having a source of electromotive force such as a generator $G_1$, an exploring coil is connected with the binding post 9 of the analyzer circuit, and the switches 11 and 12 are moved to their metallic positions. By bringing the coil 14 in proximity to the power circuit current will be set up in the said coil. By varying the condenser 3 throughout its range, various resonant points may be obtained and the frequency values of the harmonics may be determined. It should be noted, however, that when an exploring coil is used, its inductance will, in many cases, be sufficient to induce an error in the normal calibration of the analyzer, so that a separate calibration should be made with the exploring coil in the circuit. If the intensity of the tone is such as to permit the use of the shunt resistance, however, the original calibration curve of the analyzer will probably be found correct.

In Figs. 2 and 3, a coil 15 is shown bridged across the distant end of the signaling circuit $T_1$. This coil may under certain conditions be omitted and the distant end of the circuit may be left open.

It will be seen that the foregoing arrangement discloses a simple and effective means for quickly determining the frequency of the harmonics which may be present in any circuit under test, by means of which the wave form may be determined, and the causes of inductive interference may be made known. Although this invention has been disclosed as embodied in a single form, it is to be understood that it is capable of embodiment in other and different forms without departing from the spirit and scope of the appended claims.

What is claimed is:

1. In an electrical measuring instrument the combination of a resonant circuit comprising inductance, capacity and an indicating device adapted to have a voltage wave impressed thereon, and means to divert from the resonant circuit part of the current resulting from the said voltage wave, thereby decreasing the sensitivity of the said indicating device.

2. In an electrical measuring instrument the combination of a circuit having induced therein a voltage wave, the form of which it is desired to investigate, a circuit comprising inductance, capacity and an indicating device adapted to be brought into resonance for component frequencies of the voltage wave induced in the said first circuit, and means associated with the said second circuit whereby it may be shunted so that part of the current set up by the said voltage wave may be diverted therefrom.

3. In an electrical measuring device the combination of a circuit having induced therein a voltage wave the form of which it is desired to investigate, a circuit comprising inductance, capacity and indicating device, adapted to be bridged across the first said circuit and a variable resistance also adapted to be bridged across said first circuit to divert from the said second circuit part of the current that normally would flow therethrough.

4. In an electrical measuring instrument the combination of a plurality of conductors having induced therein an electro-motive force to ground, a circuit comprising inductance, capacity and an indicating device adapted to be connected with the said conductors and to be brought into resonance with the said electro-motive force, switching means adapted to group together the terminals of the said conductors and to ground the said resonant circuit, and a second switching means adapted to connect between the said grouped conductors and ground, a variable resistance shunt for controlling the current flow through the said indicating device.

5. In an electrical measuring instrument the combination of a power circuit having an electro-motive force impressed thereon, and a testing circuit adapted to be connected therewith, comprising current limiting resistances, a resonant circuit comprising inductance, a variable capacity and an indicating device whereby the said test circuit may be brought into resonance with the electro-motive force impressed on the said power circuit and a variable resistance adapted to divert from the said resonant circuit part of the current set up in the said test circuit by the electro-motive force, impressed thereon by the power circuit.

In testimony whereof, I have signed my name to this specification this 6th day of April, 1920.

HARRY W. HITCHCOCK.